United States Patent [19]
Moreira

[11] Patent Number: 5,191,344
[45] Date of Patent: Mar. 2, 1993

[54] METHOD FOR DIGITAL GENERATION OF SAR IMAGES AND APPARATUS FOR CARRYING OUT SAID METHOD

[75] Inventor: Alberto Moreira, Gilching, Fed. Rep. of Germany

[73] Assignee: Deutsche Forschungsanstalt fur Luft- und Raumfahrt, Cologne, Fed. Rep. of Germany

[21] Appl. No.: 799,214

[22] Filed: Nov. 27, 1991

[30] Foreign Application Priority Data

Nov. 27, 1990 [DE] Fed. Rep. of Germany ....... 4037725

[51] Int. Cl.$^5$ .............................................. G01S 13/90
[52] U.S. Cl. .......................................... 342/25; 342/195
[58] Field of Search ................. 342/25, 189, 195, 162, 342/179

[56] References Cited

U.S. PATENT DOCUMENTS

| H741 | 2/1990 | Powell et al. | 342/25 |
|---|---|---|---|
| 4,034,370 | 7/1977 | Mims | 342/25 |
| 4,227,194 | 10/1980 | Herman et al. | 342/25 |
| 4,292,634 | 9/1981 | Wu et al. | 342/25 |
| 4,471,357 | 9/1984 | Wu et al. | 342/25 |
| 4,564,839 | 1/1986 | Powell | 342/25 |
| 4,768,156 | 8/1988 | Whitehouse et al. | 364/516 X |
| 4,771,287 | 9/1988 | Mims | 342/25 |
| 4,924,229 | 5/1990 | Eichel et al. | 342/25 |
| 4,999,635 | 3/1991 | Niho | 342/25 |
| 5,021,789 | 6/1991 | Shaw | 342/25 |
| 5,043,734 | 8/1991 | Niho | 342/25 |
| 5,057,843 | 10/1991 | Dubois et al. | 342/25 |
| 5,113,194 | 5/1992 | Krikorian et al. | 342/106 |

FOREIGN PATENT DOCUMENTS 0083107  7/1983  European Pat. Off. .

OTHER PUBLICATIONS

R. C. Hansen; IEEE Transactions on Aerospace & Electronic Systems; AES-10(6):800-804; (1974); "The Segmented Aperture Synthetic Aperture Radar (SA-SAR)".

Medina et al; "Implementation of a Subaperture Image Formation Technique for SAR" May 27, 1991; pp. 179-186.

Primary Examiner—John B. Sotomayor
Attorney, Agent, or Firm—Browdy and Neimark

[57] ABSTRACT

In a method for digital generation of SAR images obtained by means of a coherent imaging system a signal compression in the azimuth and/or range direction is carried out with high resolution by means of a subaperture configuration. A stepwise linear approximation of a quadratic phase characteristic is performed with regard to a reference function and frequency overlapping of the subapertures is effected for optimizing the approximation of the phase characteristic. For the formation and synthesis of the subapertures complex multiplications are carried out, the signal of each subaperture thereby being shifted in the frequency. The individual subapertures are integrated twice by means of the moving average method for reducing the side lobes of the low resolution impulse response and after a time shift for equalizing the relative positioning of the subapertures and after the complex multiplications for the frequency shift the results obtained in the individual subapertures are coherently summated.

3 Claims, 4 Drawing Sheets

METHOD FOR DIGITAL GENERATION OF SAR IMAGES AND APPARATUS FOR CARRYING OUT SAID METHOD

BACKGROUND OF THE INVENTION

1. Field of the Invention

The invention relates to a method for digital generation of SAR images obtained by means of a coherent imaging system carried by a carrier, a signal compression being obtained in the azimuth and/or range direction with high resolution by a coherent summation of subapertures and an apparatus for carrying out said method.

2. Description of the Prior Art

Radar with synthetic aperture (SAR) is employed for two-dimensional imaging of the earth's surface, of planets and objects. Because it is independent of the weather, can be used during the day and during the night and has a high geometrical resolution, imaging with SAR is very advantageous. However, very complicated processing is necessary to generate an SAR image and at present only a few specially constructed computers achieve a real time processing with high image quality.

Hereinafter the mode of operation of an SAR system and the necessary data processing for generating an image of high resolution and quality will be explained. An SAR system includes a carrier, for example an aircraft, a helicopter, a satellite and the like, which moves with constant velocity, an antenna having a viewing direction aligned transversely, i.e. to the left or right, of the moving direction, and a coherent radar system which periodically transmits electromagnetic pulses. The backscattered radar echoes are received, mixed down and quadrature demodulated (in the I and Q channel), digitized and processed to generate a two-dimensional image. The movement direction is denoted as azimuth and the direction perpendicularly thereto as range; the bandwidth of the transmitted pulses defines the range resolution. A high range resolution is possible by linear frequency modulation (increasing the bandwidth). In this case, processing of the backscattered radar echo in the range direction is necessary to achieve a high range resolution. This processing is defined in accordance with the theory of the matched filter, a convolution of the received signal with the conjugated complex time-inverted replica of the transmitted modulated pulse being carried out. The replica is referred to as reference function, a convolution operation as pulse compression and a resultant function of the pulse compression from a single imaged point target as point target response.

The azimuth resolution for a conventional incoherent side-looking radar is limited by the physical antenna length in the aircraft. The azimuth resolution is therefore defined by the product of antenna aperture angle and distance between carrier and target. In this case it is therefore not possible to carry out and obtain imaging with high resolution from a great distance.

An azimuth resolution of synthetic aperture radar (SAR) is very much improved by using an antenna with wide beam in the azimuth and carrying out a coherent imaging. In this case a given target is illuminated by the antenna during several pulses and each echo is received coherently. A long synthetic antenna can be formed in that the quadratic phase variation in the azimuth direction caused by the range variation during the illumination time between carrier and target is corrected. To enable a phase information to be evaluated a coherent radar system is required for the transmission and reception.

A quadratic phase characteristic in the azimuth direction means a linear frequency modulation and this is referred to as Doppler characteristic. The entire bandwidth of an azimuth signal is referred to as Doppler bandwidth. To achieve high resolution, processing in the azimuth direction consists of convoluting the azimuth signal with a reference function calculated from the geometry and this is then referred to as pulse compression in the azimuth direction. Since the target illumination time in the azimuth direction increases linearly with the range, the length of the synthetic aperture becomes greater with increasing range. As a result, the azimuth resolution becomes independent of the range.

Image representation of processed complex data requires formation of an absolute value. To do this, the signals in the I and Q channel are squared and added (i.e. $(I^2+Q^2)$); thereafter, the square root is taken therefrom.

If the range variation during the illumination time of the radar system in the azimuth direction is greater than half the resolution in the range direction, range migration must be corrected. A further processing is necessary in the azimuth processing when the Doppler centroid, i.e. the frequency in the centre of the Doppler bandwidth, is not equal to zero. In such a case the bandwidth of the reference function is adapted to the Doppler bandwidth of the azimuth signal by a frequency shift. To reduce the speckle noise present due to coherent processing in the imaging of area targets in SAR images, a socalled multi-look processing is carried out in the azimuth direction (see U.S. Pat. No. 4,292,634). In a multi-look processing an incoherent addition is carried out of statistically independent images which are generated by division of the available Doppler bandwidths into individual looks and generated by the conventional signal compression.

The standard deviation of speckle noise decreases with the square root of the number of looks, leading to an improved radiometric resolution and thus to better image quality. The image quality of an SAR image depends on the contrast, geometric and radiometric resolution, the side lobe suppression of the point target response and a loss in the processing. The looks may also overlap, leading to a more effective utilization of the bandwidth available. More looks can then be formed by the overlapping and thus a better radiometric resolution achieved. For this reason an overlapping of up to 60% is usually employed.

If the velocity of the carrier is not constant, small deviations of the nominal path of the carrier occur or the distance variation between carrier and target is not known, automatic focussing must be carried out in the azimuth processing to avoid the contrast and geometric resolution in the azimuth direction deteriorating (see EP 0 083 107 A3). An optimum reference function is then calculated from an analysis of the azimuth signal by automatic focussing. The calculation must be carried out accurately frequently enough to enable rapid variations of the movement error to be corrected. With the automatic focussing, not only the correct flying speed and its variations are determined but also phase errors resulting from horizontal and vertical deviations from the desired path.

Due to the high data rate, which is usually greater than 5 Mbyte/s, and due to a complicated data processing for generating an SAR image, consisting of a signal compression in the azimuth and range direction, a correction of the range migration a Doppler centroid determination, a multi-look processing and an automatic focussing, frequently more than $10^{10}$ operation/s are necessary to carry out a real-time processing.

In conventional SAR processors processing is carried out with digitized data and for this purpose computer systems are employed having array processors or special hardware configurations. In U.S. Pat. No. 4,132,989 (by R. A. Frosch and W. E. Arens of January 1979) a digital SAR processing in the time range is described; in this case a time correlation of a received signal with a reference function is formed in the azimuth and range direction. As soon as the number of points (P) of the reference function is more than 32 said method requires a high computing expenditure. This is because for each correlated point P complex multiplications and (P-1) complex additions are necessary. Other operations, such as range migration, are also carried out in the time range with very high computing expediture.

At present, a digital SAR processing in the frequency domain is mostly employed (see Wu, C.: "Digital Fast Correlation Approach SAR Imagery", Proc. of the IEEE Int. Radar Conf., p. 153 to 160 of April 1980). Here, a fast Fourier-transformation (FFT) algorithm is employed for a signal compression in the range and azimuth direction. This method is based on the fact that a convolution in the time domain in accordance with the convolution theory of the Fourier transformation corresponds to a multiplication in the frequency domain. The signal received and the reference function are first Fourier-transformed, then multiplied with each other and finally transformed back to the time domain by the inverse Fourier transformation. This processing is substantially faster than the formation of the time correlation and therefore also makes it possible to carry out the correction of the range migration and the Doppler centroid determination in efficient manner in the frequency domain.

A subaperture method is also employed for the digital SAR data processing. This method is based on the coherent addition of subapertures which are obtained by dividing the signal bandwidth in the azimuth and/or range direction. In U.S. Pat. No. 4,227,194 the subapertures with adapted phase correction are coherently added, a linear phase correction being carried out in each subaperture by a fedback summation term.

M. Sack (see Sack, M. et al: "Application of Efficient Linear FM Matched Filtering Algorithmus to Synthetic Aperture Radar Processings", IEEE Proc., Vol. 132, No. 1, p. 45 to 57 of 1985) describes a digital method for SAR data processing by frequency analysis which is referred to as SPECAN method. In this method a received signal is mixed with a frequency-modulated signal having an opposite frequency characteristic. A frequency analysis is then carried out of the result of the mixing by means of a fast Fourier transformation (FFT). This method can be carried out faster than the method operating in the frequency range because only one fast Fourier transformation (FFT) is required for generating an image. Disadvantages of the SPECAN method are the sample spacing of the image data varying with the modulation rate, the inflexibility for correcting the quadratic range migration and the poorer geometric resolution.

To obviate the disadvantages of the SPECAN method and improve the image quality, a socalled step transform method has been developed (see Sack M. et al as above and Medina, M., Magota N.: "Implementation of a Subaperture Image Formation Technique for SAR", ISW '89, Eleventh Annual Ideas in Science and Electronics Exposition and Symposium, Editor: Christman C., Alubuquerque, NM, USA: Ideas in Science and Electronics 1989, pages 179 to 186). In the step transform method the mixing signal is divided into smaller overlapping signals and the fast Fourier transformation is replaced by two fast Fourier transformations with smaller number of points. By the first Fourier transformation the subapertures are formed and by the second Fourier transformation the subapertures are coherently summated.

To perform a frequency analysis of the SAR signal, multiphase filters, referred to as polyphase filters, are employed. In EP patent application 227 614 A2 the digital SAR processing with the polyphase filters is a modified version of the processing by frequency analysis. To accelerate the processing the polyphase filters are implemented by parallel hardware.

An analog SAR processing with socalled SAW components (Surface Acoustic Waves) is employed at present in many radar systems with a pulse compression in the range direction. The processing is carried out in the intermediate frequency (IF) plane prior to the demodulation in quadrature, the SAW component playing the part of a delay network in the pulse compression. For the analog signal compression in the azimuth direction charge-coupled means (CCDs) are employed. With such charge-coupled devices the analog azimuth signal is sampled in the base band and a time correlation of the azimuth signal performed with the aid of an azimuth reference function.

A disadvantage of the known methods for digital generation of SAR images is the high computing expenditure. Due to the high demands a real-time processing can be achieved only with considerable expenditure because hardware implementation always involves high complexity, high power consumption, large dimensions and high costs. In the case of analog processing the dynamic range and the signal/noise ratio is restricted to 50 dB at the most; moreover, the flexibility and accuracy of the processing are reduced.

SUMMARY OF THE INVENTION

Consequently, the invention aims at providing a method for digital generation of SAR images and an apparatus for carrying out the method with which high geometrical resolution and high image quality can be achieved.

The invention therefore proposes in a method for digital generation of SAR images obtained by means of a coherent imaging system carried by a carrier, a signal compression being obtained in the azimuth and/or range direction with high resolution by a coherent summation of subapertures, the improvement in which a stepwise linear phase approximation is carried out for correction of the square phase characteristic of the SAR signal in the azimuth and/or range direction, for optimizing the phase approximation a frequency overlapping of the subapertures is effected, the individual subapertures are integrated twice by means of the moving average method for reducing the side lobes of the low resolution pulse response and for formation and synthesis of the subapertures complex multiplications by signal-constant frequency are carried out so that the signal of each subaperture is shifted in the frequency.

In a further development of said method in the signal compression in the azimuth or range direction a received digitized SAR signal (S(N)) is multiplied in parallel connected multiplying units by complex signals ($G_i$), i extending from $-A_s$ to $+A_s$ and ($2A_s+1$) being the total number of subapertures s, the output signals of the multiplying units are filtered in integrating units with memories in that in each memory of the integrating units a value just integrated is written over the oldest stored value, thereafter for suppressing side lobes and for simultaneous signal delay a second integration is carried out in further integrating units; the output signals of the further integrating units are multiplied in multiplying units by complex signals ($H_i$) and weighted, said signals having been obtained previously from the information of the frequency modulation of the input signal, and finally the weighted signals of a number of subapertures are summated in following adders and after passing through detection units are combined in a further adder to give an output signal (F(N)) with a higher radiometric resolution.

The invention further proposes an apparatus for carrying out the method according to the invention, comprising for the pulse compression in the range direction a range control unit for determining required parameters, such as frequency shifts ($GE_i$, $HE_i$), a number of points (NE1) for integration in the range direction and number of points (NE2) for a delay of the subapertures; a multiplying unit in which digitized received SAR data (S(N)) of each radar echo are mixed with the frequency shift signals ($GE_i$); an integrating unit following the multiplying unit for filtering with an integration length corresponding to the point number (NE1) which is followed by a further integrating unit which serves for another filtering and by which the individual subapertures each with (NE2) points are relatively delayed; a further multiplying unit in which the output data of the integrating unit are mixed with the frequency shift signals ($HE_i$) by the azimuth control unit and an adder following the multiplying unit for coherent summation of the subapertures, and for pulse compression in the azimuth direction an azimuth control unit for determining parameters, such as frequency shifts ($GA_j$, $HA_j$), a number of points (NA1) for an integration in the azimuth direction, a point number (NA2) for a delay of the subapertures and shift and interpolation values (ZEW) for correction of the range migration and a multiplying unit in which the output data generated in the pulse compression in the range direction are mixed with the frequency shift signals ($GA_j$) of the azimuth control unit; a memory in which the output signals of the multiplying unit are written sequentially in the range direction and then read in the azimuth direction; an integrating unit following the memory for filtering with an integration length corresponding to the point number (NA1) which for a further filtering is followed by a further integrating unit by which the individual subapertures are subjected to a relative delay of (NA2) points; a shift and interpolation unit which follows the integrating unit and in which a range migration (ZEW) configured by the azimuth control unit is corrected in the azimuth processing; a focussing unit connected to the output of the shift and interpolation unit for automatic focussing of the image data; a Doppler analysis unit likewise connected to the output of the shift and interpolation unit for determining the Doppler centroid, the output signals of the focussing unit and of the Doppler analysis unit being fed back separately to the azimuth control unit; a further multiplying unit which follows the shift and interpolation unit and in which the subapertures are mixed with the frequency shift signals ($HA_j$) of the azimuth control unit; a summation unit which follows the multiplying unit and in which a synthesis of the subapertures is carried out by a coherent summation; a detection unit which follows the summation unit and in which the amplitude of each look is formed and an adding unit which follows the detection unit and in which the looks are incoherently summated.

In the method according to the invention a reduction of the computing expenditure in the signal compression in the range and azimuth direction for generating an SAR image is achieved in that a subaperture configuration is employed for the processing and a stepwise linear approximation of the phase characteristic is carried out as regards the reference function. In accordance with the invention an approximation is optimized so that the same image quality as in the known methods is achieved, the latter requiring however high computing expenditure. According to the invention, in each subaperture the compression of a small frequency range of the signal received is performed, thereby very much simplifying the necessary operations in each subaperture. Although in each subaperture only a low resolution is obtained, on coherent summation of the subapertures a high resolution is achieved.

To accelerate the execution of the method the subaperture processing can also be carried out in parallel. In addition, according to the invention the correction of the range migration and the determination of the Doppler centroid in the azimuth processing are carried out without high hardware expenditure. The subaperture configuration is also very flexible as regards a multilook processing because the number of looks is variable by incoherent combination of subapertures without the processing parameters and settings having to be changed. With the subaperture configuration automatic focussing for correcting the movement error of a carrier is also readily possible; for this purpose a comparison is carried out between the signals in the subapertures for determining the deviation due to the movement error.

BRIEF DESCRIPTION OF THE DRAWINGS

Hereinafter the invention will be explained in detail with the aid of preferred embodiments with reference to the attached drawings, wherein.

DESCRIPTION OF THE PREFERRED EMBODIMENTS

Figure 1:
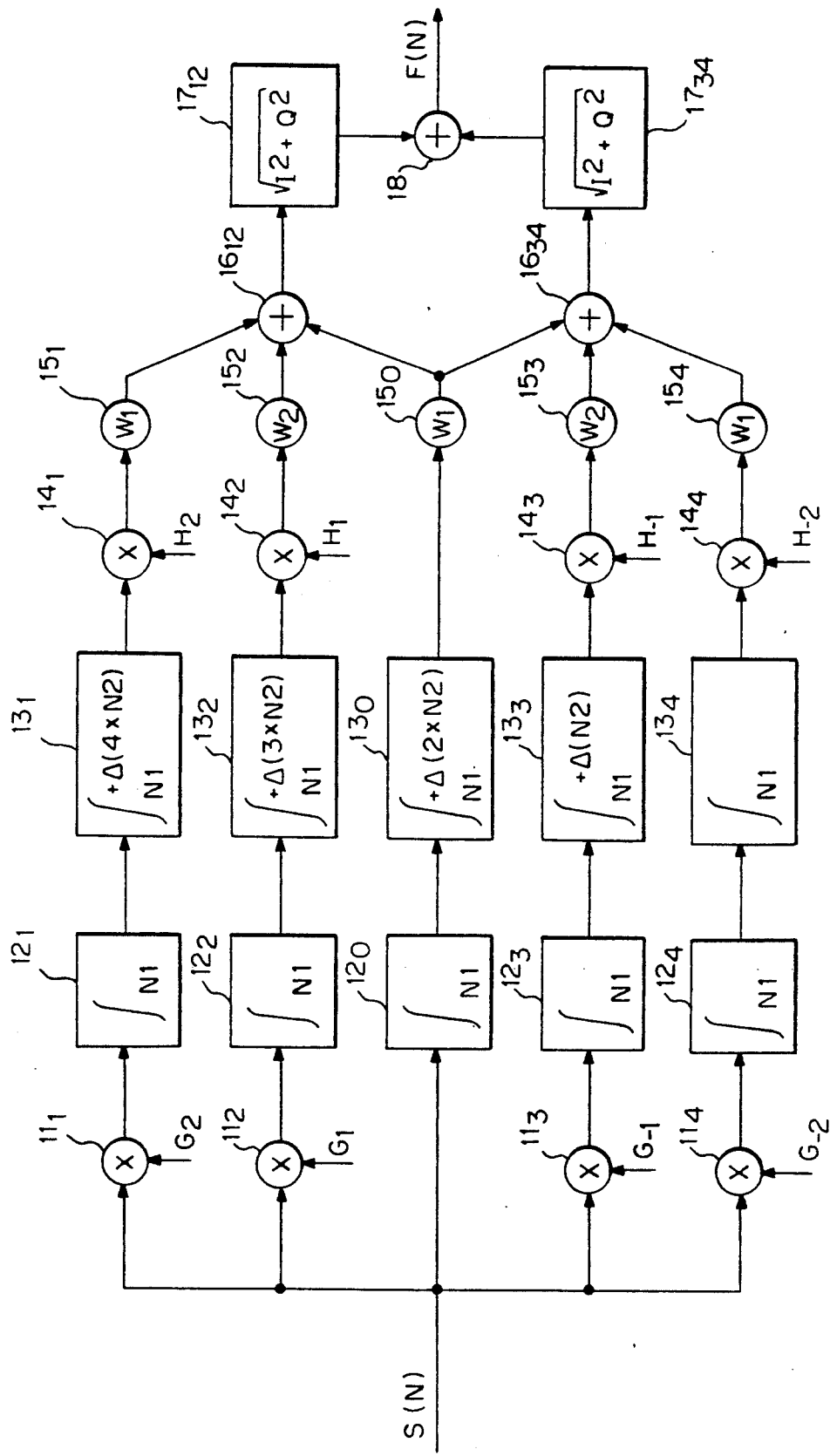
FIG. 1 shows an example of embodiment of an apparatus for carrying out the method, a pulse compression being carried out by means of a multilook processing involving two (2) looks.

FIG. 1 shows a preferred embodiment of the invention in which a stepwise linear approximation of a phase history is formed for a reference function from a subaperture configuration. An input signal S(N) is entered with regard to the range and azimuth direction, N being an integral variable relating to the number of the sampled value. The variation of the signal S(N) for a point target is illustrated in FIG. 2 with 2.1, but only one of the channels I or Q is represented.

In each of a number of complex multipliers $11_1$ to $11_4$ the received signal S(N) is multiplied by complex signals $G_i$ which are calculated from the information of the frequency modulation of the signal S(N). The variation range of i extends from $-A_s$ to $+A_s$, $(2A_s+1)$ being the total number of subapertures s. In the example of embodiment of FIG. 1 $A_s=2$, i.e. $-2 \leq i \leq 2$. By the multiplication in the individual multipliers $11_1$ to $11_4$ the frequency history of the input signal S(N) is shifted and subapertures are generated as indicated schematically in FIG. 2 by the signals 2.2. The signals $G_i$ have a constant frequency characteristic and the frequency difference between two adjacent signals $G_i$ for a mixing is always constant. For the central aperture arranged in the middle in FIG. 1 no multiplier unit is necessary because the frequency shift in this case is equal to zero. The complex output signal of each of the multipliers $11_1$ to $11_4$ is filtered by means of following simple integrating units $12_0$ to $12_4$, the integrating units $12_0$ to $12_4$ each having an integration length N1. The integration is carried out separately for the two I and Q channels by means of a moving average operation, no correction of the square phase characteristic being necessary. Thus, for each filtered point in the I and Q channel in each case only one addition and one subtraction is required; the result of the previous integration is added to the newest value to be integrated and subtracted from the oldest value of the integration set. For this purpose, in each of the integration units $12_0$ to $12_4$ for the necessary integration length N1 in each case a memory having N1 storage locations is required, the newest value to be integrated being written over the oldest value in the memory.

Figure 2:
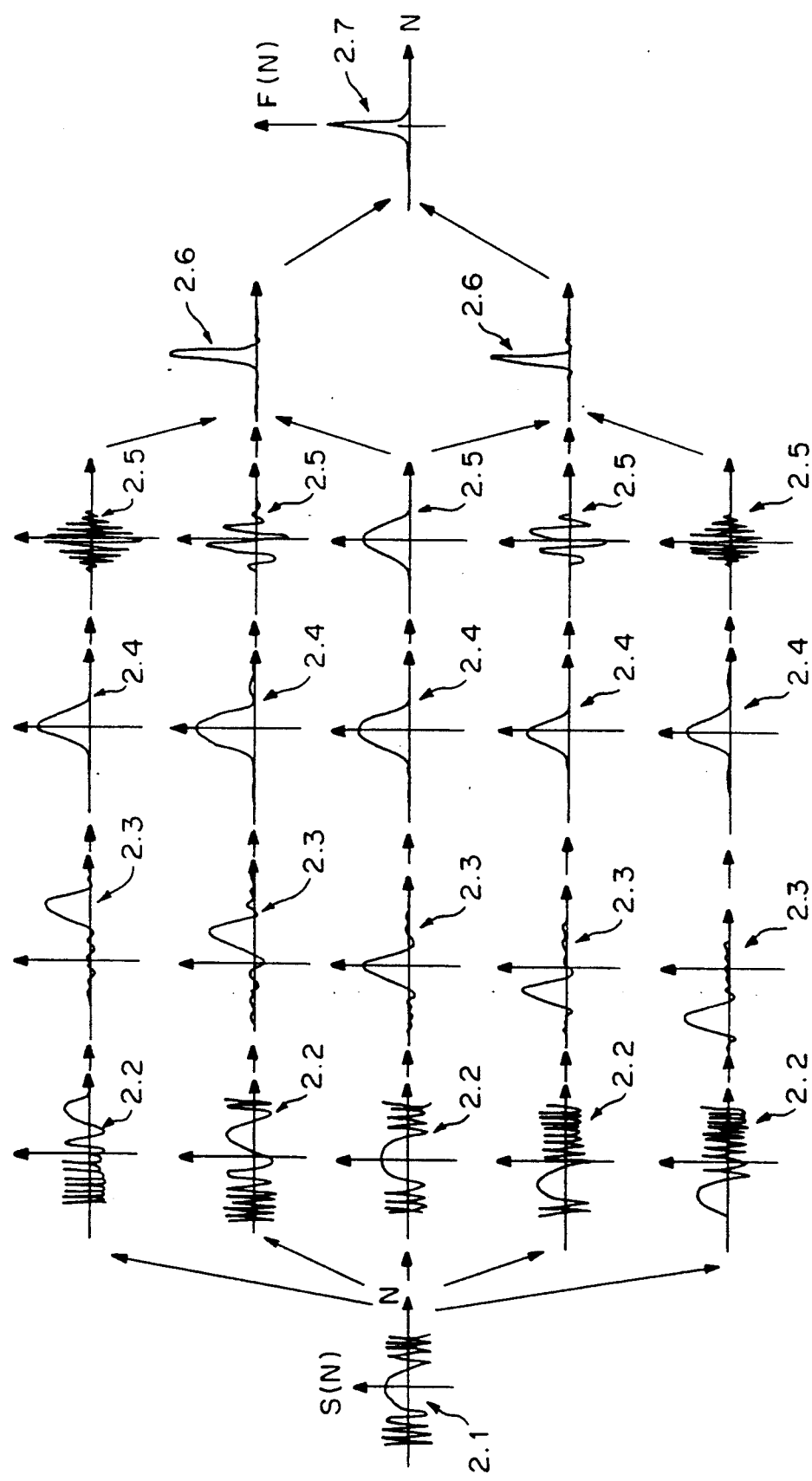
FIG. 2 shows a signal profile in various parts of the embodiment set forth in FIG. 1.

Due to the integration, at the point where the frequency is equal to zero in each subaperture a pulse is generated which has a low resolution and a great number of high side lobes as illustrated in FIG. 2 by the curves 2.3. The following integrating units $13_0$ to $13_4$ perform a second integration, whereby the side looks are strongly suppressed. In the same integrating units $13_0$ to $13_4$, a shift of points is carried out, as it is shown in FIG. 2 by the curves 2.4. After this shift of points, the generated pulses in the individual subapertures always lie at the same point. Each of the further integrating units $13_0$ to $13_4$ comprises for this purpose a memory having a storage capacity of $(N1(i+2).N2)$, the parameter $(i+2)$. N2 corresponding to the number of points of the shift and beeing $-2 \leq i \leq 2$.

Since to form a high resolution pulse low resolution pulses must be combined, in multiplying units $14_1$ to $14_4$ following the integrating units $13_0$ to $13_4$ in each case a constant frequency shift is performed for each subaperture; for this purpose the low resolution pulses are mixed with signals Hi as indicated in FIG. 2 by signal profiles 2.4. The frequency shift of the signals $H_i$ is opposite to the frequency shift of the signals $G_i$ and the signals Hi are determined corresponding to the signals $G_i$ from the information of the frequency modulation of S(N). Multiplication of the signals $H_i$ by the low resolution pulse response ensures that the phase characteristic over the subapertures on coherent summation of the latter is continuous. This continuity of the phase characteristic must be ensured in order to obtain a high resolution pulse on summation of the subapertures.

In following multiplying units $15_0$ to $15_4$ a scalar weighting Wi is carried out for each subaperture and for this reason each highly resolved pulse has then only low side lobes, as illustrated in FIG. 2 by the curves 2.5. As apparent from the curves 2.6 in FIG. 2 a synthesis of a highly resolved pulse is carried out by complex addition of the subapertures by means of two adders $16_{12}$ and $16_{34}$ in which the output signals of the multiplying units $15_0$, $15_1$ and $15_2$ or $15_0$, $15_3$ and $15_4$ are added.

In FIG. 1 a multilook configuration having two (2) looks is shown, each look being generated by summing a group of three subapertures. In subsequent detection units $17_{12}$ and $17_{34}$ the necessary value formation is then carried out, the looks being generated. These looks are finally summated in a following adder 18, giving the curve profile 2.7 shown schematically in FIG. 2. Although the output signal F(N) resulting therefrom has the same geometrical resolution as the pulses at the output of the detection units $17_{12}$ and $17_{34}$, because of the incoherent addition of the looks they have a better radiometric resolution.

In FIG. 1 the looks overlap by 33%, the central subaperture making a contribution to the generation of both looks. The flexibility of this structure for a multilook processing resides in that the number of looks and the overlapping value can be selected freely within a large range. All that is needed to do this is a new configuration of the adders $16_{12}$ and $16_{34}$, the amount-forming units $17_{12}$ and $17_{34}$ and the following adder 18.

The invention can however be implemented in various other manners. For the operations carried out by means of the multiplying units $11_1$ to $11_4$ and the following integrating units $12_0$ to $12_4$ and $13_0$ to $13_4$, a fast Fourier transformation (FFT) algorithm may be employed, and before the Fourier transformation a weighting with a triangular function is introduced i.e. before the Fourier transformation of F points said F points are multiplied by a triangular function having an identical number of points. A Fourier transformation can be employed because after a Fourier transformation of F points the same number of frequency channels is obtained and in each frequency channel a frequency shift and subsequent summation is carried out. The number of points of each Fourier transformation can be chosen so that by means of the fast Fourier transformation the same frequency shift as with the multipliers $11_1$ to $11_4$ and the same point number of the integration as with the integrating units $12_0$ to $12_4$ and $13_0$ to $13_4$ is achieved.

Since the integration carried out twice in each case with N1 points with the aid of the integrating units $12_0$ to $12_4$ and $13_0$ to $13_4$ corresponds to a single integration with a triangular function with 2.N1, i.e. the convolution of two rectangular functions corresponds to a single convolution with a triangular function of twice the point number, the numerical operations of the units $11_1$ to $11_4$, $12_0$ to $12_4$ and $13_0$ to $13_4$ in FIG. 1 can be completely replaced by the FFT algorithm with a triangular function for weighting the data. In similar manner, the FFT algorithm can be employed to perform the operations of the multipliers $14_0$ to $14_4$ and the adders $16_{12}$ and $16_{34}$, a weighting according to the scalar values $W_i$ in FIG. 1 being introduced before the Fourier transformation.

Figure 3:
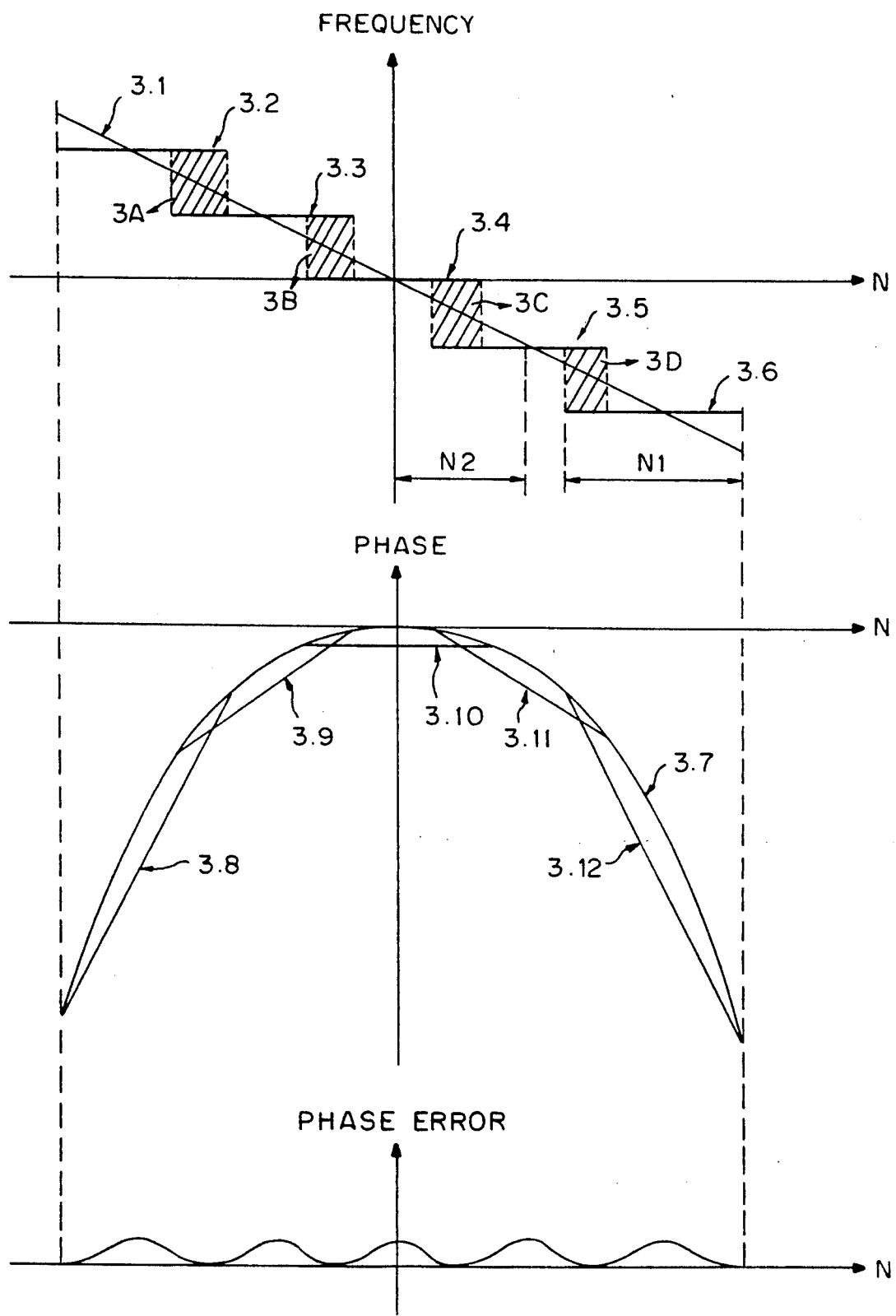
FIG. 3 shows a stepwise linear approximation of the phase characteristic for determining a reference function of each subaperture and a resulting approximated frequency history and phase error.

In FIG. 3 a frequency and phase characteristic of a point target is represented by curves 3.1 and 3.7. The curves 3.2 to 3.6 and 3.8 to 3.12 represent the corresponding frequency and phase approximations achieved with the embodiment of FIG. 1 and a curve 3.13 shown in the lower part of FIG. 3 represents the phase error resulting from the approximation. A constant frequency characteristic is obtained by the frequency shift with the aid of the multipliers $11_1$ to $11_4$ and is represented by the curves 3.2 to 3.6. The integration period of each subaperture is denoted by N1 and the point shift between the subapertures is given by N2. The approximated phase characteristic represented by the curves 8.1 to 8.12 is obtained by integration of the approximated frequency characteristic. The difference between the approximated phase characteristic and the quadratic phase characteristic gives the phase error corresponding to the curve 3.13.

The phase error leads to the high side lobes in the low resolution pulses as indicated in FIG. 2 by the curves 2.3; these high side lobes are then suppressed by the second integration carried out with the aid of the integrating units $13_0$ to $13_4$, as apparent in FIG. 2 from the curves 2.4. The overlapping between the subapertures in FIG. 3, indicated by hatched regions 3A to 3D, the regions each having (N1–N2) points, lead to a further reduction of the side lobes of the high resolution point target response because the phase error resulting therefrom is smaller in the regions of the overlapping between the subapertures. For example for an overlapping of 21% between the subapertures and with a maximum phase error of 28° within an integration time of a subapertures a side lobe suppression of 35 dB results and in most cases this is sufficient. With an overlapping of 57% the side lobe suppression increased to 45 dB and this meets considerably higher demands.

To increase the geometrical resolution and to increase the number of looks the number $(2A_s+1)$ of subapertures s can be increased until the entire available bandwidth is utilized. If only part of the available bandwidth is utilized a reduction of the sampling can be implemented after the second integration. In this case an additional filter unit (socalled presumming unit) before the signal compression is no longer necessary.

Figure 4:
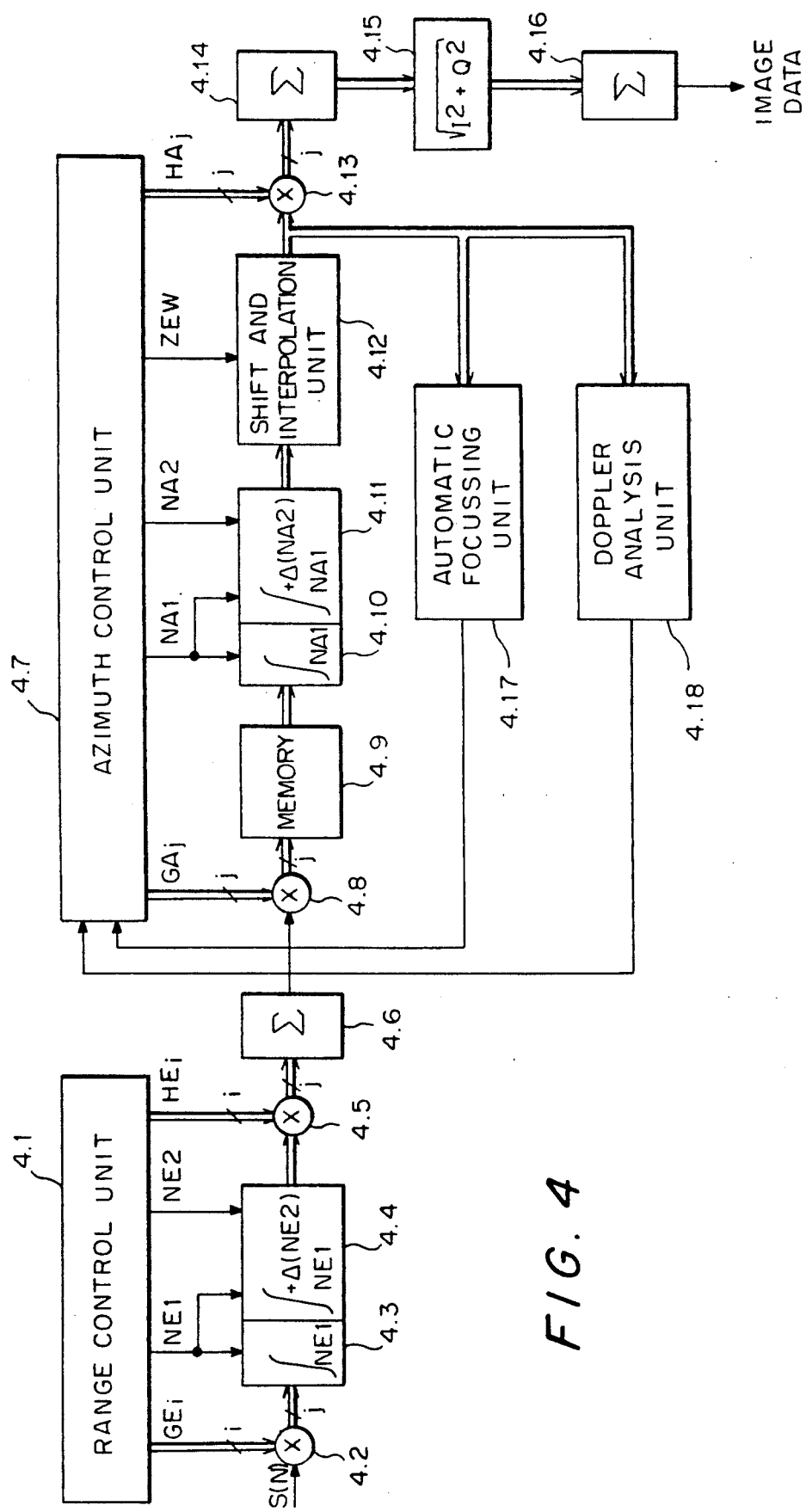
FIG. 4 is an overall block diagram of an SAR processor in which the embodiment according to FIG. 1 is employed for signal compression in the range and azimuth direction.

In FIG. 4 a block diagram of an SAR processor is illustrated and provides a schematic illustration of the embodiment in FIG. 1 used for signal compression in the range and azimuth direction. In the pulse compression in the range direction, the parameters of the pulse modulation are first entered; in this manner, the number i of the subapertures is again calculated for the desired range resolution, the frequency shifts $GE_i$ and $HE_i$, the number of points NE1 for the integration and the number of points NE2 for the delay of the subapertures by means of a range control unit 4.1. The same applies to a signal compression in the azimuth direction, the calculation of the number j of subapertures for the desired azimuth resolution, the frequency shifts GAj and HAj, the number of points NA1 for the integration, the number of points NA2 for the delay of the subapertures and the coordinates ZEW for correction of the range migration being performed by an azimuth control unit 4.7. These calculated parameters for the azimuth processing are updated with increasing range because the Doppler characteristic changes with the range.

The first processing in the generation of an SAR image is achieved by pulse compression in the range direction. The digitized values of each pulse S(N) are mixed by multiplying units 4.2, corresponding to the multipliers $11_1$ to $11_4$ in the embodiment of FIG. 1, with the signals $GE_i$, filtered with an integration length of NE1 points by integrating units 4.3 and 4.4 corresponding to the integrating units $12_0$ to $12_4$ in the embodiment of FIG. 1, then again filtered by a unit 4.4 corresponding in the embodiment of FIG. 1 to the units $13_0$ to $13_4$, and then delayed, the relative delay between two adjacent subapertures being NA2 points, and finally mixed with the signal $HE_i$ by a multiplying unit 4.5 corresponding to the multiplying units $14_1$ to $14_4$ in the embodiment of FIG. 1, and then coherently summated in an adder 4.6 corresponding to the adders $16_{12}$ to $16_{34}$ in the embodiment of FIG. 1. In the adder 4.6 a scalar weighting is additionally interposed for each subaperture corresponding to the weighting in the units $15_0$ to $15_4$ of the embodiment of FIG. 1 in order to suppress the side lobes of the point target response.

The result of the signal compression in the range direction is mixed with the signals $GA_j$ by a multiplying unit 4.8 again corresponding to the multipliers $11_1$ to $11_4$ of FIG. 1. As a result each radar echo consists of T range gates and the number of range gates is defined by the number of sampled values in the digitizing of each radar echo. The necessary size of a following memory 4.9 for each subaperture is then obtained by multiplying the number of range gates T by the point NA1 of the integration, the integration being carried out by means of an integrating unit 4.10 corresponding to the integrating units $12_0$ to $12_4$ of FIG. 1. When writing a radar echo in the memory 4.9 of each subaperture all the range gates are sequentially addressed and stored. The data of the integrating unit 4.10 for each range gate, sequentially addressed, is then read in the azimuth direction. This makes access in the azimuth direction possible for the next processing steps. The integrating units 4.10 carries out an integration with NA1 points. The subapertures are then again filtered with NA1 points by a following integration and delay unit 4.11 corresponding to the units $13_1$ to $13_4$ in FIG. 1 and then delayed with a relative shift of NA2 points. The correction of the range migration by means of a shift and interpolation unit 4.12 is effectively carried out before the synthesis of the subapertures by a shift of the data in the range direction. If the shift is a fractional number an interpolation is carried out to increase the accuracy of the correction. Parameters ZEW for the correction of the target wandering are calculated by means of an azimuth control unit 4.7 and must likewise be updated with increasing range.

Before synthesis of the subapertures an automatic focussing and determination of the Doppler centroid is also carried out. In the automatic focussing, in a focussing unit 4.17 the amplitude of the subapertures are correlated with each other and the maximum of the correlation is determined. The maximum indicates whether the positioning of each subaperture relatively to the other is correct, as shown by the curve 2.4 in FIG. 2, or whether the shift of the subapertures is necessary for correcting the movement error. If the positioning is correct, the calculated parameters for the signal compression are identical with the input in the azimuth control unit 4.7. If a shift is necessary for obtaining identity of the positioning of the subapertures the automatic focussing unit 4.17 passes the information regarding the shift to the azimuth control unit 4.7, in which the new parameters for the signal compression in the azimuth direction are then calculated.

By means of a Doppler analysis unit 4.18 determining the Doppler centroid, the mean power of a certain number of points is then first calculated for each subaperture. Since in each subaperture the filtering of a frequency range of the Doppler characteristic is carried out, the maximum of the power corresponds to the central region of the antenna directional pattern in the azimuth direction. This region also corresponds to the Doppler centroid. By interpolation between calculated values, i.e. the mean power in each subaperture, the accuracy of the determination of the Doppler centroid is increased because the frequency quantizing stages become smaller due to the interpolation.

Thereafter, each subaperture is mixed with the signals $HA_i$ by a following multiplying unit 4.13 and a synthesis is carried out by coherent summation in a summation unit 4.14. The amplitude of each look is formed by an detection unit 4.15 which corresponds to the detection units $17_{12}$ and $17_{34}$ of the embodiments in FIG. 1. The looks are then incoherently summated in an adding unit 4.16 which corresponds to the adding unit 18 in the embodiment of FIG. 1. At this point image data of high resolution and high quality are then generated.

In the case of illumination geometries with high drift angle the phase characteristic in the azimuth of a point target may contain a cubic component. The subaperture configuration according to the invention makes it possible to approximate the phase characteristic of each subaperture in a linear characteristic and the same configuration to be used in spite of the cubic component for the pulse compression. At the same time, the calculation of the signal profiles $GA_i$ and $HA_i$ having only linear phase components, is simplified.

I claim:

1. A method for digital generation of SAR images obtained by means of a coherent imaging system carried by a carrier, a signal compression being obtained in the azimuth and/or range direction with high resolution by a coherent summation of subapertures, wherein an overlapped stepwise linear phase approximation is carried out for correction of the quadratic phase characteristic of the SAR signal in the azimuth and/or range direction, whereby the remaining phase error in each subaperture due to the linear phase approximation is limited to 115 degrees and a triangular weighting is used for integration of the subapertures, for optimizing the phase approximation and suppressing the remaining phase error in each subaperture, a frequency overlapping of the subapertures is effected, whereby a minimum overlap of 21% between the subapertures is used, the individual subapertures are integrated twice by means of the moving average method for reducing the sidelobes of the low resolution pulse response, this integration corresponding to a triangular amplitude weighting, and for formation and synthesis of the subapertures, complex multiplications by signals-constant frequency are carried out, so that the signal of each subaperture is shifted in frequency by the required amount that provides the minimum frequency overlap of 21%.

2. A method according to claim 1, wherein in the signal compression in the azimuth or range direction a received digitized SAR signal (S(N)) is multiplied in parallel connected multiplying units by complex signals ($G_i$); i extending from $-A_s$ to $+A_s$ and ($2A_s+1$) being the total number of subapertures s;

the output signals of the multiplying units ($11_1$ to $11_4$) are filtered in integrating units ($12_0$ to $12_4$) with memories in that in each memory of the integrating units a value just integrated is written over the oldest stored value;

thereafter for suppressing side lobes and for simultaneous signal delay a second integration is carried out in further integrating units ($13_0$ to $13_4$);

the output signals of the further integrating units ($13_0$ to $13_4$) are multiplied in multiplying units $14_1$ to $14_4$ by complex signals ($H_i$) and weighted, said signals having been obtained previously from the information of the frequency modulation of the input signal, and finally the weighted signals of a number of subapertures are summated in following adders ($16_{12}$, $16_{34}$) and after passing through detection units ($17_{12}$, $17_{34}$) are combined in a further adder (18) to give an output signal (F(N)) with a higher radiometric resolution.

3. An apparatus for carrying out the method according to the claim 1, comprising for the signal compression in the range direction a range control unit (4.1) for determining required parameters, such as frequency shifts ($GE_i$, $HE_i$), a point number (NE1) for integration in the range direction and point number (NE2) for a delay of the subapertures;

a multiplying unit (4.2) in which digitized received SAR data (S(N)) of each radar echo are mixed with the frequency shift signals ($GE_i$);

an integrating unit (4.3) following the multiplying unit (4.2) for filtering with an integration length corresponding to the number of points (NE1) which is followed by a further integrating unit (4.4) which serves for another filtering and by which the individual subapertures each with (NE2) points are relatively delayed;

a further multiplying unit (4.5) in which the output data of the integrating unit (4.4) are mixed with the frequency shift signals ($HE_i$) by the azimuth control unit (4.1) and an adder (4.5) following the multiplying unit (4.5) for coherent summation of the subapertures, and for signal compression in the azimuth direction an azimuth control unit (4.7) for determining parameters, such as frequency shifts ($GA_j$, $HA_j$), a number of points (NA1) for an integration in the azimuth direction, a number of points (NA2) for a delay of the subapertures and shift and interpolation values (ZEW) for correction of the range migration, and a multiplying unit (4.8) in which the output data generated in the signal compression in the range direction are mixed with the frequency shift signals ($GA_j$) of the azimuth control unit (4.7);

a memory (4.9) in which the output signals of the multiplying unit (4.8) are written sequentially in the range direction and then read in the azimuth direction;

an integrating unit (4.10) following the memory (4.9) for filtering with an integration length corresponding to the number of points (NA1) which for a further filtering is followed by a further integrating unit (4.11) by which the individual subapertures are subjected to a relative delay of (NA2) points;

a shift and interpolation unit (4.12) which follows the integrating unit (4.11) and in which a range migration (ZEW) configured by the azimuth control unit (4.7) is corrected in the azimuth processing;

a focussing unit (4.17) connected to the output of the shift and interpolation unit (4.12) for automatic focussing of the image data;

a Doppler analysis unit (4.18) likewise connected to the output of the shift and interpolation unit (4.12) for determining the Doppler centroid, the output signals of the focussing unit (4.17) and of the Doppler analysis unit (4.18) being fed back separately to the azimuth control unit (4.7);

a further multiplying unit (4.13) which follows the shift and interpolation unit (4.12) and in which the subapertures are mixed with the frequency shift signals ($HA_j$) of the azimuth control unit (4.7);

a summation unit (4.14) which follows the multiplying unit (4.13) and in which a synthesis of the subapertures is carried out by a coherent summation;

a detection unit (4.15) which follows the summation unit (4.14) and in which the amplitude of each look is formed and an adding unit (4.16) which follows the detection unit (4.15) and in which the looks are incoherently summated.

* * * * *